United States Patent
Yigang et al.

(10) Patent No.: US 8,635,288 B2
(45) Date of Patent: Jan. 21, 2014

(54) METHODS AND SYSTEMS FOR EXPIRATION HANDLING IN ELECTRONIC MESSAGE SYSTEMS

(75) Inventors: Cai Yigang, Naperville, IL (US); Aihao Yin, Shandong (CN)

(73) Assignee: Alcatel Lucent, Paris (FR)

( * ) Notice: Subject to any disclaimer, the term of this patent is extended or adjusted under 35 U.S.C. 154(b) by 480 days.

(21) Appl. No.: 12/744,839

(22) PCT Filed: Dec. 18, 2007

(86) PCT No.: PCT/US2007/087904
§ 371 (c)(1),
(2), (4) Date: May 26, 2010

(87) PCT Pub. No.: WO2009/078870
PCT Pub. Date: Jun. 25, 2009

(65) Prior Publication Data
US 2010/0287249 A1    Nov. 11, 2010

(51) Int. Cl.
*G06F 15/16* (2006.01)
(52) U.S. Cl.
USPC .......................................... 709/206; 709/204
(58) Field of Classification Search
USPC .................................. 709/206, 204
See application file for complete search history.

(56) References Cited

U.S. PATENT DOCUMENTS

| 6,088,720 | A | 7/2000 | Berkowitz et al. |
| 6,968,361 | B2 | 11/2005 | Okamura |
| 7,149,893 | B1 | 12/2006 | Leonard et al. |
| 2003/0018724 | A1* | 1/2003 | Mathewson et al. .......... 709/206 |
| 2005/0193078 | A1* | 9/2005 | Jordan .......................... 709/206 |
| 2005/0204008 | A1 | 9/2005 | Shinbrood |
| 2006/0019639 | A1 | 1/2006 | Adams et al. |

OTHER PUBLICATIONS

International Report on Patentability and Written Opinion, PCT/US2007/087904, Jul. 1, 2010.
International Search Report, PCT/ISA/210, Apr. 2007.
Written Opinion, PCT/ISA/237, Apr. 2007.
Chinese Office Action, Application No. 200780101967.7, Aug. 8, 2011.
Supplementary European Search Report, Application No. EP 07 86 9414, Jul. 2, 2012.
Chinese Office Action, Chinese Patent Application No. 200780101967.7, Sep. 28, 2012.

* cited by examiner

*Primary Examiner* — Dustin Nguyen
*Assistant Examiner* — Joel Mesa
(74) *Attorney, Agent, or Firm* — Fay Sharpe LLP (57) ABSTRACT

Systems and methods are described for electronic message expiration processing, in which a message originator or recipient can set an expiration time/date attribute for individual emails, short messages, or other electronic messages, and the messages are automatically deleted from the recipient's system or handled according to other user-selected processing rules when the expiration time/date has past.

32 Claims, 10 Drawing Sheets

METHODS AND SYSTEMS FOR EXPIRATION HANDLING IN ELECTRONIC MESSAGE SYSTEMS

CROSS-REFERENCE TO RELATED APPLICATIONS

This application is a national stage entry of international application number PCT/US2007/087904, having international filing date of Dec. 18, 2007, which was published in English, the entirety of which is hereby incorporated by reference as if fully set forth herein.

FIELD OF THE INVENTION

This invention relates generally to the field of communications systems, and more particularly to systems and techniques for handling expiration of electronic messages.

BACKGROUND OF THE INVENTION

With the advent of the Internet, email, short messaging, and other modern communications advances, people are receiving and managing more and more electronic messages on a daily basis. For example, new emails are received at an email server and are placed under an in-box folder of a subscriber or user's mailbox, identified by the user's email account. The user can view the incoming emails on the servers using a web-browser, or may download them to a local computer to be viewed using local client email software tools. Every day, people expect to receive different kinds of emails in their mailbox, whether personal, business related, advertisements, news, or even undesirable spam emails. Often, a user may be a customer of online stores or may subscribe to online groups from which promotional or advertising messages are received. Electronic messages from such sources are typically temporally relevant, for example, and may indicate that the promotion or the subscription is valid through a fixed time period. Work-related messages within a business enterprise are often sent as reminders of meetings, deadlines, schedules, etc., and are thus also relevant for only a certain amount of time. Such temporally relevant electronic messages may therefore become stale or irrelevant after a certain amount of time. However, absent management of these messages by the recipient, they remain on the email server even after the promotion or meeting is over. Thus, there is a need for techniques and systems by which electronic messages can be managed to reduce the amount of system resources devoted to messages that are no longer important to the user.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present disclosure relate to methods and systems by which the above-mentioned shortcomings can be resolved or mitigated in processing electronic messages. Expiration attributes are associated with electronic messages and systems are enhanced to selectively apply user-configurable expiration rules to messages for which the relevant time period has passed in order to minimize space occupation by such messages and to mitigate the amount of management required of a message service subscriber. The disclosure is applicable to all types of electronic messages, including without limitation emails, SMS short messages, etc., wherein such messages may be selectively modified according to user-specified expiration parameters with a temporal expiration value being associated with a message, and the recipient's email system being configured to assess whether the time range associated with the message has ended, and to take appropriate action to remove the stale messages from the system without further user intervention. This novel approach facilitates improved electronic message handling efficiency and reduced risks of in-box overflow situations, and provides a mechanism for advertisers or other senders of time-relevant messages to allow subscribers to receive such information without having to worry about managing the messages. Additionally, the disclosure helps to avoid or mitigate the possibility of promotion or advertising messages jamming the subscribers' mailboxes/folders permanently or being spammed. In addition, the solution may advantageously allow a subscriber who is away on vacation or otherwise not checking their message system to completely avoid dealing with certain messages that provide a promotion that is only valid during the absence of the user. Thus, a user returning from a two-week vacation does not have to read and delete promotional messages regarding a one-day sale that occurred a week ago.

In accordance with one or more exemplary aspects of the disclosure, a method is provided for electronic message expiration handling or processing. The method includes determining whether an electronic message has a temporal expiration value, and if so, determining whether the electronic message is to be expired based on the temporal expiration value and a current time. If the message is to be expired, the method provides for selectively processing the message based on an expired electronic message handling rule. The electronic message in various embodiments can be an email, for which a determination is made as to whether the message includes a temporal expiration value in a message header. Other embodiments include short messages (SMS).

With respect to originators of temporally relevant electronic messages, certain embodiments of the disclosure allow the user/sender to set a temporal expiration value for a given outgoing electronic message when composing the message. In one implementation, the user can be prompted to select whether or not to associate an expiration value with a given message, and then to define the expiration time, either in absolute terms (e.g., good until the end of business today) or in relative terms (e.g., good for two hours). In one implementation, the method in this regard includes adding an expiration header with a temporal expiration value to the electronic message.

In certain embodiments, moreover, the method further includes allowing a recipient user to select from a plurality of expired electronic message handling rules to be used in processing electronic messages sent to the user, and storing the user-selected expired electronic message handling rule. In this manner, the recipient subscriber can configure their message handling to process the stale messages in a desired fashion (e.g., delete expired messages immediately and automatically, prompt the user to delete individual messages upon expiration, delete messages a fixed time period after expiration, move expired messages to a trash folder or an expiration folder, only delete expired messages if they have been read, never delete expired messages, etc.).

The method may also provide for allowing the user to modify, add, or delete a temporal expiration value associated with a given incoming electronic message. The solution thus allows a user to configure general handling procedures for expired messages, while further allowing modification of the expiration time/date for individual messages to extend the period before the messages is deemed expired.

In accordance with other aspects of the disclosure, a communications system is provided, which comprises a network operatively coupling a plurality of network elements to one another to allow transport of electronic messages between the network elements, and a first network element having an electronic message expiration system to selectively process electronic messages having a temporal expiration value based on at least one expired electronic message handling rule. The first network element in certain exemplary embodiments can be an email server, a user computer, a network server, a short message service center (SMSC), a mobile switching center (MSC), or other suitable network element that can process electronic messages in the network. In certain embodiments of the communications system, the expiration system further operates to determine whether the electronic message has a temporal expiration value in a message header. The message expiration system, moreover, may be configured to prompt the user to select from a plurality of expired electronic message handling rules to be used in processing electronic messages to the user, and to store the user-selected expired electronic message handling rule. In addition, various implementations of the expiration system may advantageously allow a user to modify, add, or delete a temporal expiration value associated with a given incoming electronic message. For outgoing messages, the expiration system may allow the sender or originator to set a temporal expiration value for a given outgoing electronic message, and may selectively add an expiration header with a temporal expiration value to the electronic message, where the expiration value may include a time zone offset.

In accordance with further aspects of the disclosure, a computer-readable medium is provided, having computer-executable instructions for determining whether an electronic message has a temporal expiration value, and if so, determining whether the message is to be expired based on the expiration value and a current time, and further if the message is to be expired, the medium includes instructions for selectively processing the message based on an expired electronic message handling rule. The computer-readable medium may further comprise computer-executable instructions for determining whether the electronic message has a temporal expiration value in a message header. Instructions may be provided, moreover, for allowing a user to select from a plurality of expired electronic message handling rules to be used in processing electronic messages to the user, as well as for storing the user-selected expired electronic message handling rule. In various embodiments, moreover, computer-executable instructions may be included to allow a recipient user to modify, add, or delete a temporal expiration value associated with a given incoming electronic message, and to allow originating users to set a temporal expiration value for a given outgoing electronic message.

In accordance with still further aspects of the disclosure, an electronic message expiration system is provided. The expiration system comprises an incoming message expiration auditing component that operates to determine whether an electronic message has a temporal expiration value. The system also includes an incoming message expiration handling component which is operative if the electronic message has a temporal expiration value to determine whether the message is to be expired based on the expiration value and a current time, and if so, to selectively process the message based on an expired electronic message handling rule. The incoming message expiration auditing and handling components may be implemented in various forms in a suitable server or element of a network, such as in an email server, a user computer, a network server, a short message service center (SMSC), and a mobile switching center (MSC) in various exemplary embodiments. In certain implementations, moreover, the incoming message expiration auditing component may be further operative to determine whether the message has a temporal expiration value in a message header, and/or to prompt the user to select from a plurality of expired electronic message handling rules to be used in processing electronic messages to the user, and to store the user-selected expired electronic message handling rule. Embodiments of the expiration system, moreover, may further include an incoming message expiration modification component operative to allow a user to modify, add, or delete a temporal expiration value associated with a given incoming electronic message. Furthermore, the system may include an outgoing message expiration processing component that allows a user to set a temporal expiration value for a given outgoing electronic message, and which may selectively add an expiration header with a temporal expiration value to the outgoing electronic message.

BRIEF DESCRIPTION OF THE DRAWINGS

The following description and drawings set forth in detail certain illustrative implementations of the present disclosure, which are indicative of several exemplary ways in which the principles of the disclosure may be carried out. Various objects, advantages, and novel features of the disclosure will become apparent from the following detailed description when considered in conjunction with the drawings, in which.

DETAILED DESCRIPTION OF THE INVENTION

Referring now to the figures, several embodiments or implementations of the various aspects of the present disclosure are hereinafter illustrated and described in conjunction with the drawings, wherein like reference numerals are used to refer to like elements.

Figure 1:
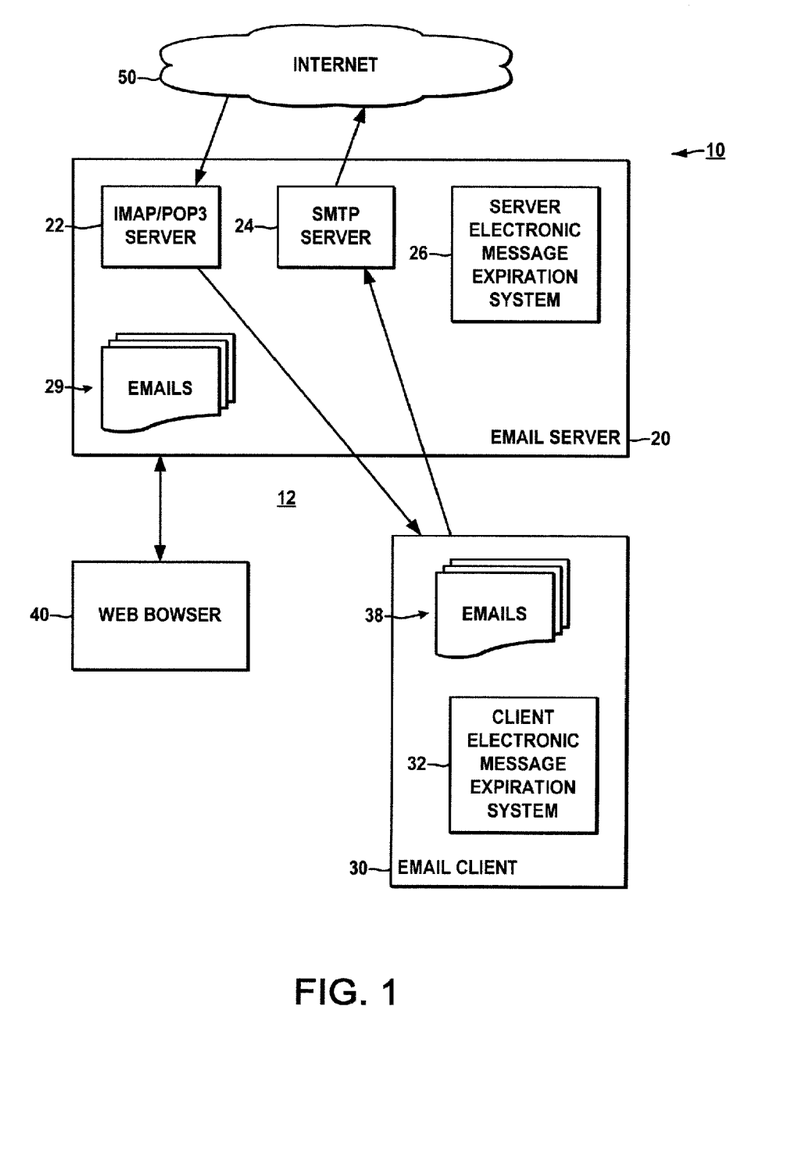
FIG. 1 is a schematic diagram illustrating an exemplary communications system in which email electronic messages are processed, including an email server and an email client both having electronic message expiration systems in accordance with various aspects of the present disclosure.

FIG. 1 illustrates an exemplary communications system 10 in which email electronic messages 29, 38 are processed and in which the various electronic message expiration aspects of the present disclosure may be carried out. The system 10 includes an email server 20, an email client 30, a web browser 40, and an Internet 50, all of which are networked together or otherwise operatively coupled to facilitate generation and transmission of electronic messages. The illustrated network elements 20, 30, 40, 50 of the system 10 can include hardware, software, firmware, logic, or combinations thereof, and the system 10 can include many other elements beyond those components shown in the drawings.

The email server 20 can be any hardware, software, or combinations thereof by which known email server functionality is implemented in a networked communications system, whether a unitary hardware system configured with suitable software, firmware, logic, etc., or the server can constitute multiple operatively connected components or subsystems with the functions being implemented in distributed fashion in accordance with the present disclosure. In general, the email server 20 provides support for sending, receiving, and storing emails 29 for the email users including a user or subscriber associated with the illustrated email server 30 in FIG. 1. The exemplary email server 30, moreover, provides two server instances on one email server. A first is a Simple Mail Transfer Protocol (SMTP) server 24 that handles outgoing mail, and the other server instance 22 is either a Post Office Protocol version 3 (POP3) server or an Internet Message Access Protocol (IMAP) server, both of which handle incoming emails 29.

The email client 30 in one embodiment is implemented as one or more software components running on a user's computer. The email client 30 interacts with the email server 20 to send and receive email electronic messages 38. For sending outgoing messages 38, the email client 30 interacts with the SMTP server instance 24, and incoming email messages 38 are downloaded by the email client 30 using the IMAP/POP3 server instance 22 to the local PC for viewing and processing by the user. The email client provides a user interface (UI), which may be a graphical user interface (GUI) with screens displayed on a visual display device, or an audio interface, or combinations thereof, with the user employing pointing devices, keyboards, touch-screen soft keys, voice commands, etc., to perform basic operations, including without limitation viewing messages, composing messages, sorting messages, moving message to local folders, deleting message, etc. In addition, the exemplary email client 30 includes a client electronic message expiration system 32 as further illustrated and described below in connection with FIG. 2.

A user may alternatively access incoming emails 29, send outgoing emails 29, and perform other electronic messaging tasks using the web browser 40 via a web interface provided by the email server 20. In this case, the email server 20 may likewise be outfitted with a server electronic message expiration system 26 as shown in FIG. 3 below.

Figure 12:
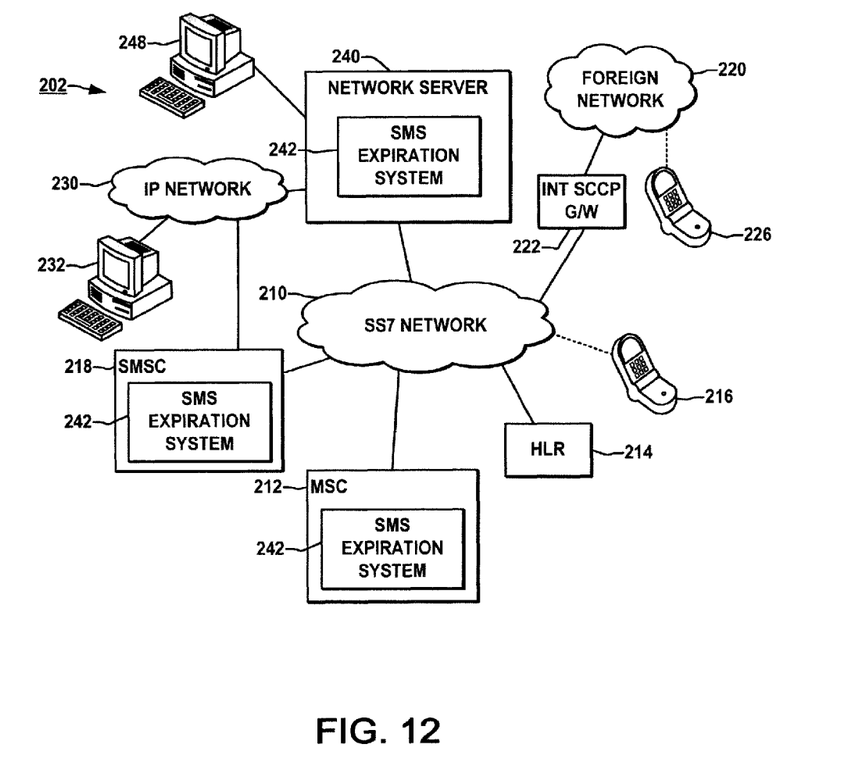
FIG. 12 is a schematic diagram illustrating another exemplary communications system with short message expiration systems in accordance with the disclosure.

The server and client electronic message expiration systems 26, 32 in FIG. 1 provide expiration features with respect to email electronic messages, wherein similarly configured electronic message expiration systems can be provided for processing other forms and types of electronic messages in accordance with various aspects of the present disclosure, including without limitation short messages (SMS messages) as shown in FIG. 12 below.

Figure 2:
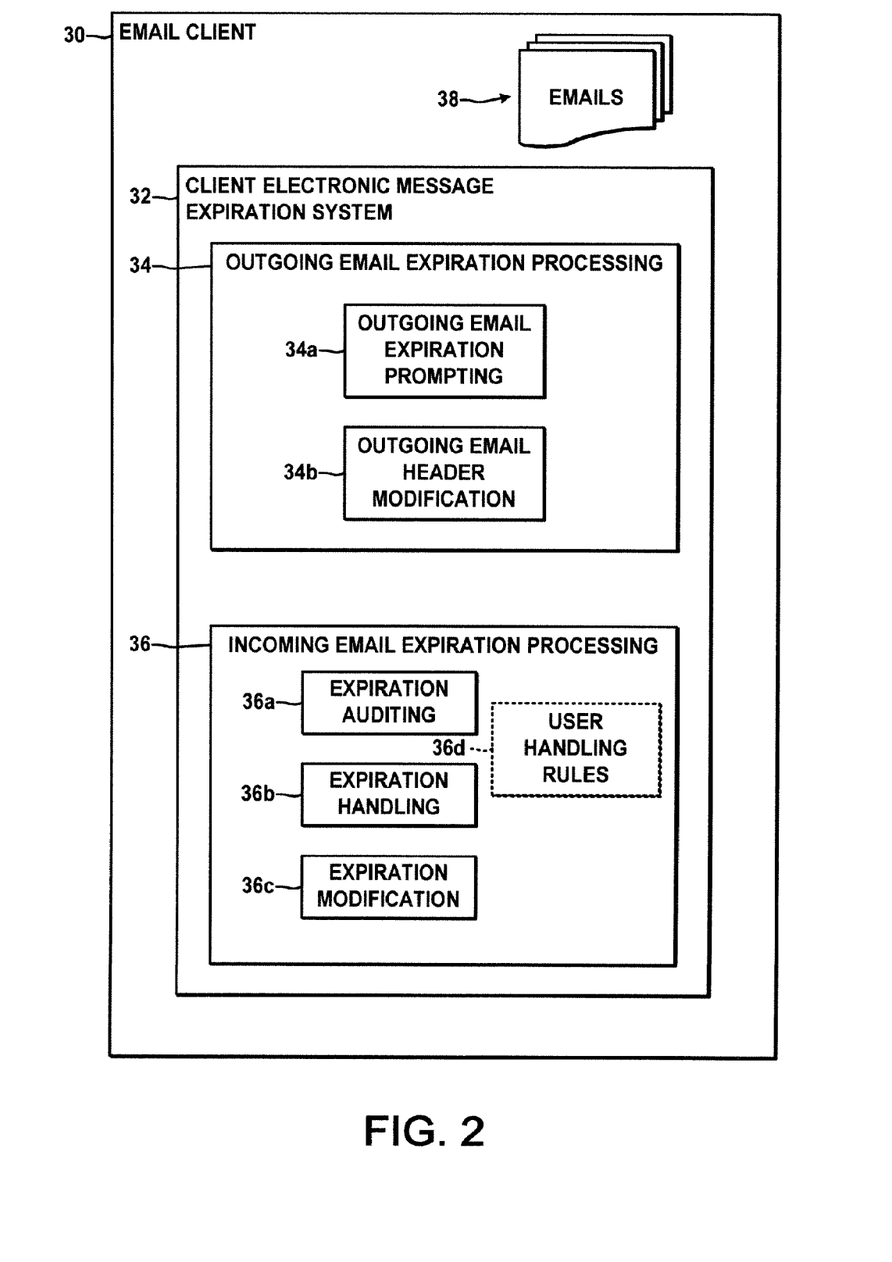
FIG. 2 is a schematic diagram illustrating further details of the exemplary email client electronic message expiration system of FIG. 1.
Figure 3:
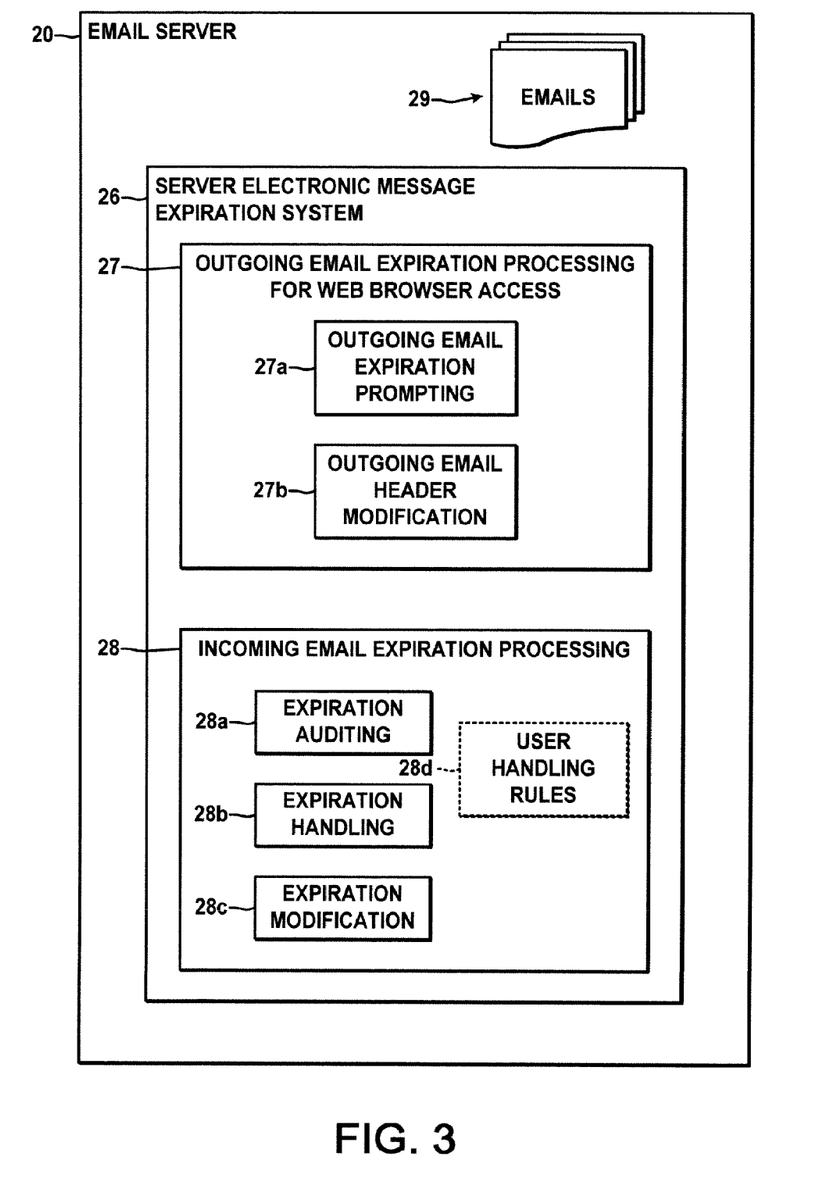
FIG. 3 is a schematic diagram illustrating further details of the exemplary email server electronic message expiration system of FIG. 1.
Figure 6:
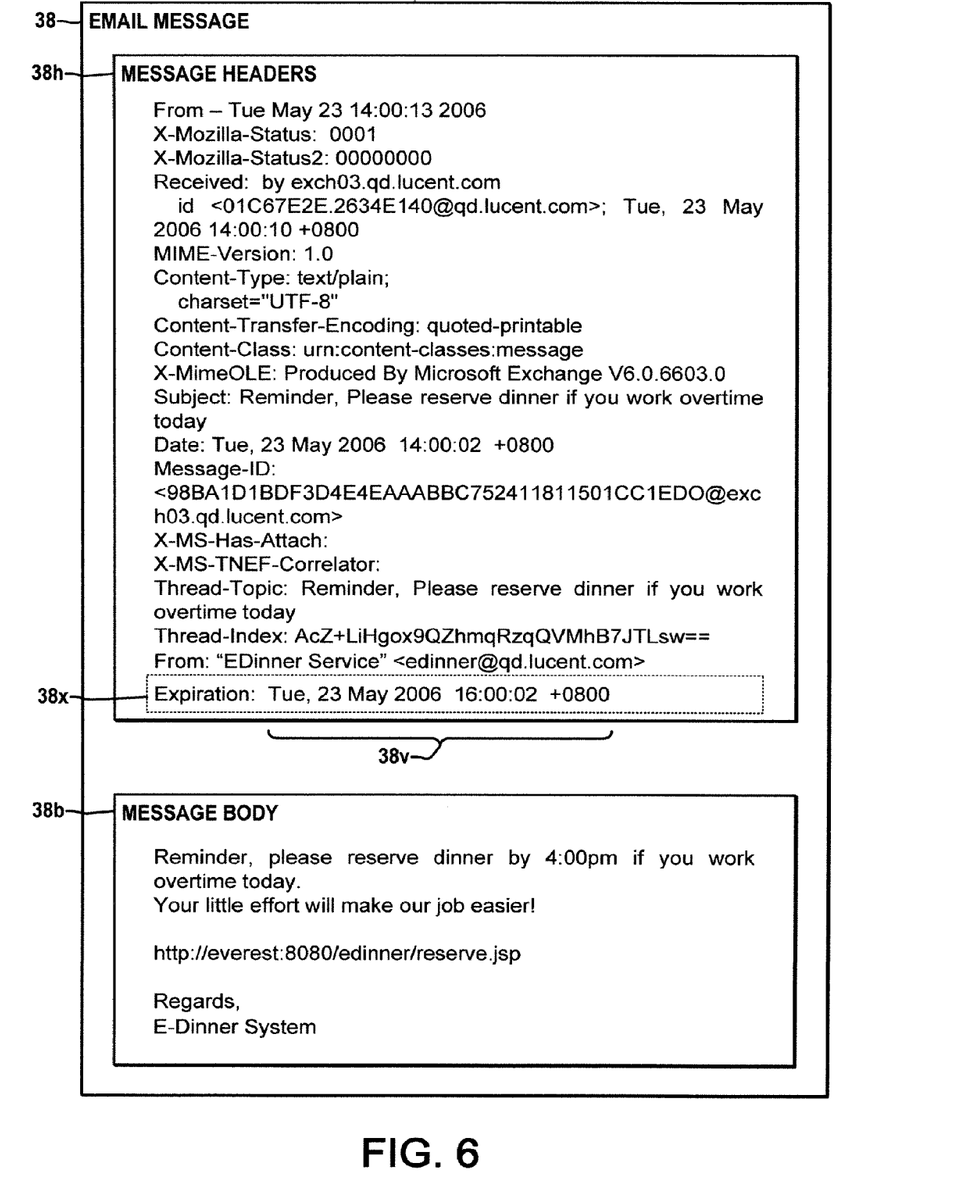
FIG. 6 is a schematic diagram illustrating an exemplary email electronic message having an expiration header with a temporal message expiration value.

Referring also to FIGS. 2 and 3, the exemplary electronic message expiration systems 26 and 32 of the email server 20 and the email client 30, respectively, may be constructed as any suitable form of hardware, software, firmware, logic, or combinations thereof in accordance with the disclosure, wherein one embodiment provides the systems 26, 32 as a computer such as the email server 20 or the user's local computer 30 storing and running the systems 26, 32 as an application program in the form of computer-executable instructions for performing the various functions described herein in order to process electronic message expiration. In general, the systems 26, 32 allow a sending user to associate a temporal expiration value (e.g., time relative to when the message is sent or an absolute time/date value) with an outgoing electronic message, and the systems 26, 32 determine whether a given incoming (e.g., received) electronic message 29, 38 has a temporal expiration value 38v (FIG. 6 below). If so, the systems 26, 32 are operative to determine whether the electronic message is to be expired based on the temporal expiration value and the current time. If the message is found to be stale (e.g., the expiration time has passed), the systems 26, 32 then selectively process the message in accordance with one or more user configurable expired electronic message handling rules 28d, 36d (FIGS. 2 and 3). The user, moreover, can in certain embodiments modify, add, or delete temporal expiration values for individual messages 29, 38. Moreover, as shown below in FIG. 12, like message expiration systems 242 can be provided for similar processing and handling of short messages (SMS) or other types or forms of electronic messages, such as in a network server 240, an SMSC 218, and/or in an MSC 212.

As shown in FIGS. 2 and 3, the exemplary email client message expiration system 32 and the email server electronic message expiration system 26 essentially provide similar or equivalent functionality, wherein a user can employ the local client expiration system 32 when accessing their emails 38 via the local computer using the email client 30, or the server-based expiration system 26 can be utilized if the user is accessing their emails 29 via the web browser 40. Moreover, both systems 26 and 32 can be provided and the systems may cooperatively implement the electronic message expiration functions set forth herein.

The email server and email client message expiration systems 26, 32 each include processing components 27, 34 for outgoing messages and processing components 28, 36 for incoming messages. For processing incoming (e.g., received) messages 29, 38, an incoming message expiration auditing component 28a, 36a is configured to determine whether a given message 29, 38 has a temporal expiration value (e.g., value 38v in FIG. 6 below). In the illustrated implementations, the auditing component 28a, 36a determines whether the electronic message 38 has a temporal expiration value 38v in a message header 38x, as shown in the example of FIG. 6 below, although the disclosure is not limited to this particular implementation. In addition, the email processing components of the email server 20 and the email client 30 also preferably allow sorting of expired (incoming) electronic messages 29, 38 using the expiration date.

If the message 29, 38 indeed has an expiration value 38v associated therewith, an incoming message expiration handling component 28b, 36b operates to determine whether the message 29, 38 is to be expired based on a comparison of the temporal expiration value 38v with the current time. If the message 29, 38 is found to be expired (e.g., the current time is past the expiration time), the handling component 28b, 36b selectively processes the message based on an expired electronic message handling rule 28d, 36d stored in the system 26, 32. The exemplary expiration systems, moreover, provide user interfaces to prompt the user to select from a plurality of handling rules 83 (FIGS. 7 and 8 below) and to store the selected rules 28d, 36d. In addition, the exemplary systems 26, 32 provide an incoming message expiration modification component 28c, 36c operative to allow the user to modify, add, or delete a temporal expiration value 38v associated with a given incoming electronic message 29, 38, as illustrated and described further in connection with FIGS. 10 and 11 below.

With respect to composition and sending of outgoing electronic messages, 29, 38, the expiration systems 26, 32 advantageously include prompting components 27a, 34a to allow a user to set a temporal expiration value 38v for a given outgoing electronic message, as well as message modification components 27b, 34b to selectively add an expiration header 38x with a temporal expiration value 38v to the outgoing electronic message. These features allow senders of known temporally relevant messages (e.g., limited time advertisements, meeting reminders, etc.) to provide recipients with information without burdening the recipient with having to affirmatively delete the received messages from their system, and also to limit the amount of resources associated with storage of the received messages in the event the user takes no action.

Figure 4:
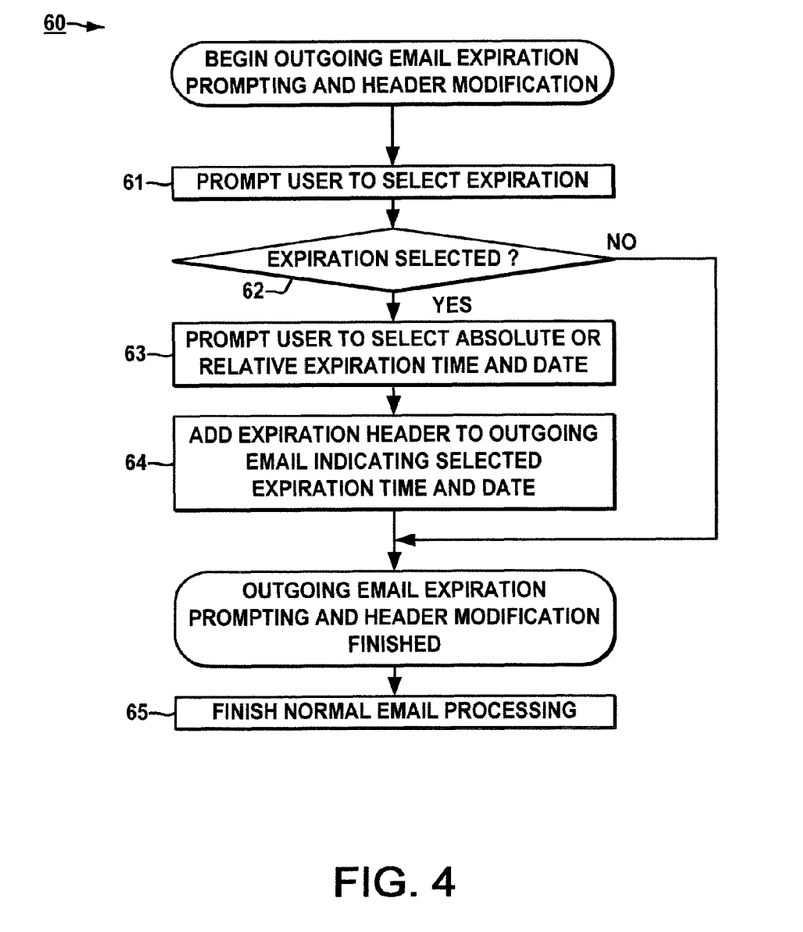
FIG. 4 is a flow diagram illustrating exemplary outgoing electronic message expiration prompting in the electronic message expiration systems of FIG. 1.
Figure 5:
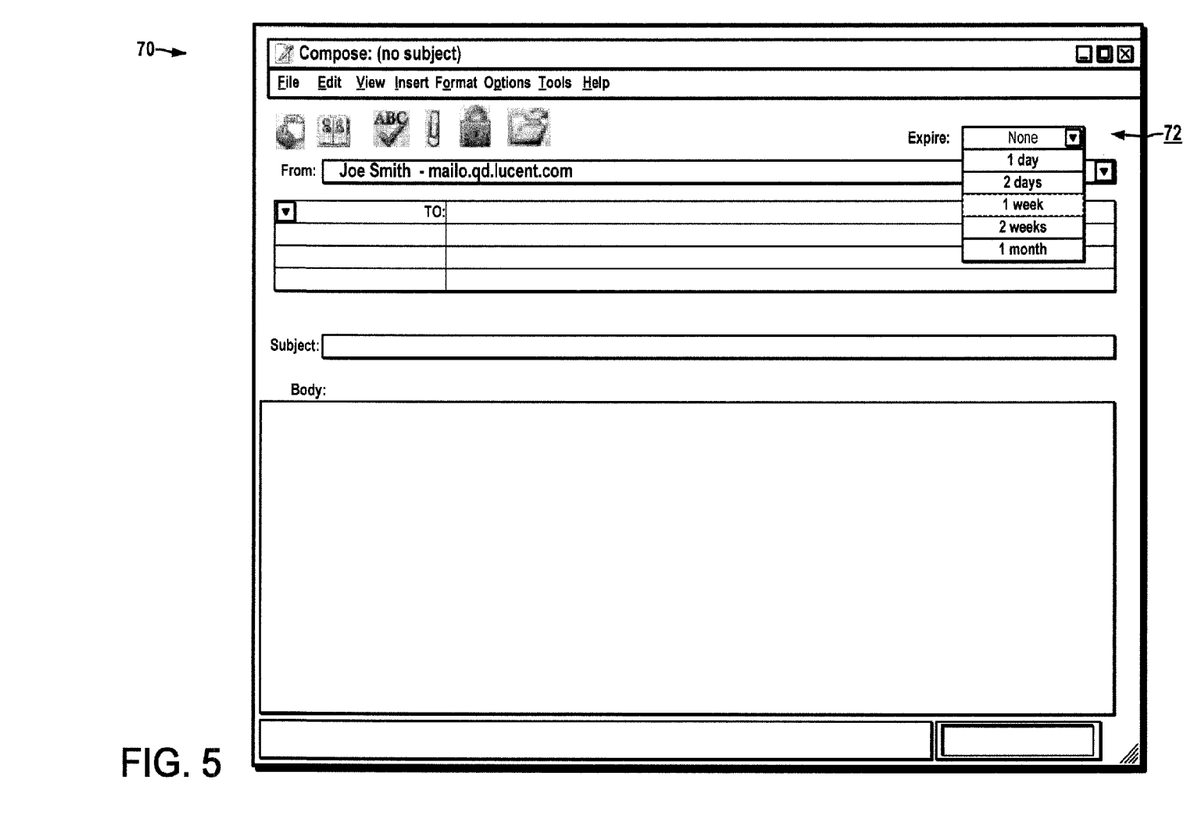
FIG. 5 is an exemplary user interface illustrating user prompting for entry of a temporal expiration value for an outgoing electronic message in the expiration systems of FIG. 1.

Referring to FIGS. 4-6, outgoing electronic message expiration prompting and example email header modification are now illustrated and described for the exemplary expiration systems of FIGS. 1-3. FIG. 4 shows a flow diagram 60 illustrating the methodology employed in the exemplary systems 26, 32 for prompting the user to selectively set an expiration value 38v for an outgoing message, and FIG. 5 illustrates an exemplary user interface 70 that can be presented to the user for the expiration time value prompting. FIG. 6 depicts an exemplary reminder email electronic message 38 modified in accordance with the present disclosure to include an additional expiration header 38x that includes a temporal expiration time/date value 38v with a time zone offset. While the exemplary prompting and header modification method 60 and other methods are illustrated and described herein as a series of acts or events, it will be appreciated that the various methods of the present disclosure are not limited by the illustrated ordering of such acts or events except as specifically set forth herein. In this regard, except as specifically provided hereinafter, some acts or events may occur in different order and/or concurrently with other acts or events apart from those acts and ordering illustrated and described herein, and not all illustrated steps may be required to implement a process or method in accordance with the disclosure. The illustrated method 60 and other methods of the disclosure, moreover, may be implemented in hardware, software, or combinations thereof, in order to provide the disclosure electronic message expiration features and functionality as described herein, wherein these methods can be practiced in hardware and/or software of the described systems, or other systems or alternate forms of logic, hardware, or software in any single or multiple entities operatively associated with a communications system, wherein the disclosure is not limited to the specific applications and implementations illustrated and described herein.

The expiration value prompting and header modification 60 begins in FIG. 4 with the user being prompted at 61 to select whether expiration is to be set for an individual outgoing email. In the interface 70 of FIG. 5, an email composition screen is illustrated, wherein an "Expire:" indicia is displayed or otherwise rendered to the user. In this respect, the option to selectively use the message expiration features for a given message can be rendered to the user by other means, such as audible prompting. In the illustrated example of FIG. 5, the interface 70 can render the "Expire:" field as shown, including a default value "None", together with a drop-down box type control actuatable by a mouse click, keyboard, voice command, etc., in order to present a list of predefined expiration values (e.g., in relative terms as shown), or additional selection features and controls may be presented to the user allowing entry of a specific expiration time/date value, whether relative or absolute. At 62 in FIG. 4, a determination is made by the expiration system 26, 32 (e.g., by the outgoing email expiration prompting component 27a, 34a) as to whether the user has selected expiration features. If not (NO at 62), the process 60 proceeds to finish the normal outgoing email processing at 65. Otherwise (YES at 62), the user is prompted at 63 to select an absolute or relative expiration time and date value 38v. With the expiration value provided to the prompting component 27a, 34a, the header modification component 27b, 34b adds an expiration header 38x at 64 to the outgoing message 38 indicating the selected expiration value 38v, as shown in FIG. 6. With the header modification, the outgoing email expiration prompting and header modification is finished and the process 60 proceeds to 65 to finish the normal outgoing email processing. Upon sending the modified email 38, the email client 30 or the email server 30 in one embodiment is operative to determine whether or not to insert the "Expiration:" header based on the users input. If a relative expiration time was entered by the user, the specified expiration time value is calculated using the sending time and the expiration period. The time zone offset value is also included to that the time can be matched globally (e.g., "+0800" in the example shown in FIG. 6).

Figure 7:
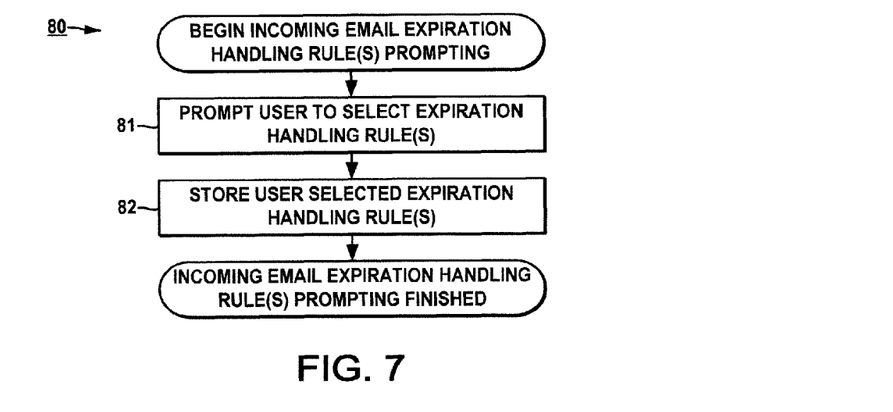
FIGS. 7 and 8 are flow and schematic diagrams illustrating exemplary incoming message handling prompting in the electronic message expiration systems of FIG. 1.
Figure 8:
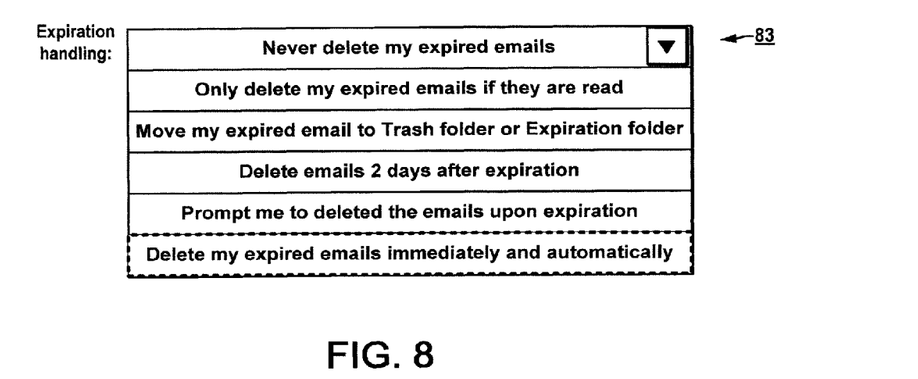

Referring now to FIGS. 7 and 8, the illustrated electronic message expiration system 26, 32 provides the user with the ability to select the desired expired email handling rule or rules to be employed for received electronic messages. The method 80 in FIG. 7 begins at 81 with the user being prompted to select one or more expiration handling rules or procedures. An exemplary user interface 83 is depicted in FIG. 8, which may be graphically, audibly, or otherwise rendered to the user, for instance, as part of an email client or email server account setup or configuration process. In the illustrated example, the user is able to select (e.g., vocally, or graphically) to utilize one or more rules such as "Never delete my expired emails", "Only delete my expired emails if they are read", "Move my expired email to Trash folder or Expiration folder", "Delete emails 2 days after expiration", "Prompt me to deleted the emails upon expiration", and/or "Delete my expired emails immediately and automatically". This exemplary list of rules is not exhaustive and other options can be provided to the user in accordance with the present disclosure. In this example, moreover, multiple rules can be selected to the extent that there is no logical inconsistency. For instance, a user might select to have emails deleted 2 days after expiration and can also specify that expired emails are to be deleted only if they have been read. Once the desired handling rule or rules have been selected, these are stored at 82. For example, the message expiration systems 26, 32 can store the selected rule(s) 28d, 36d locally as shown in FIGS. 2 and 3, or these can be stored remotely within the networked system 10.

Figure 9:
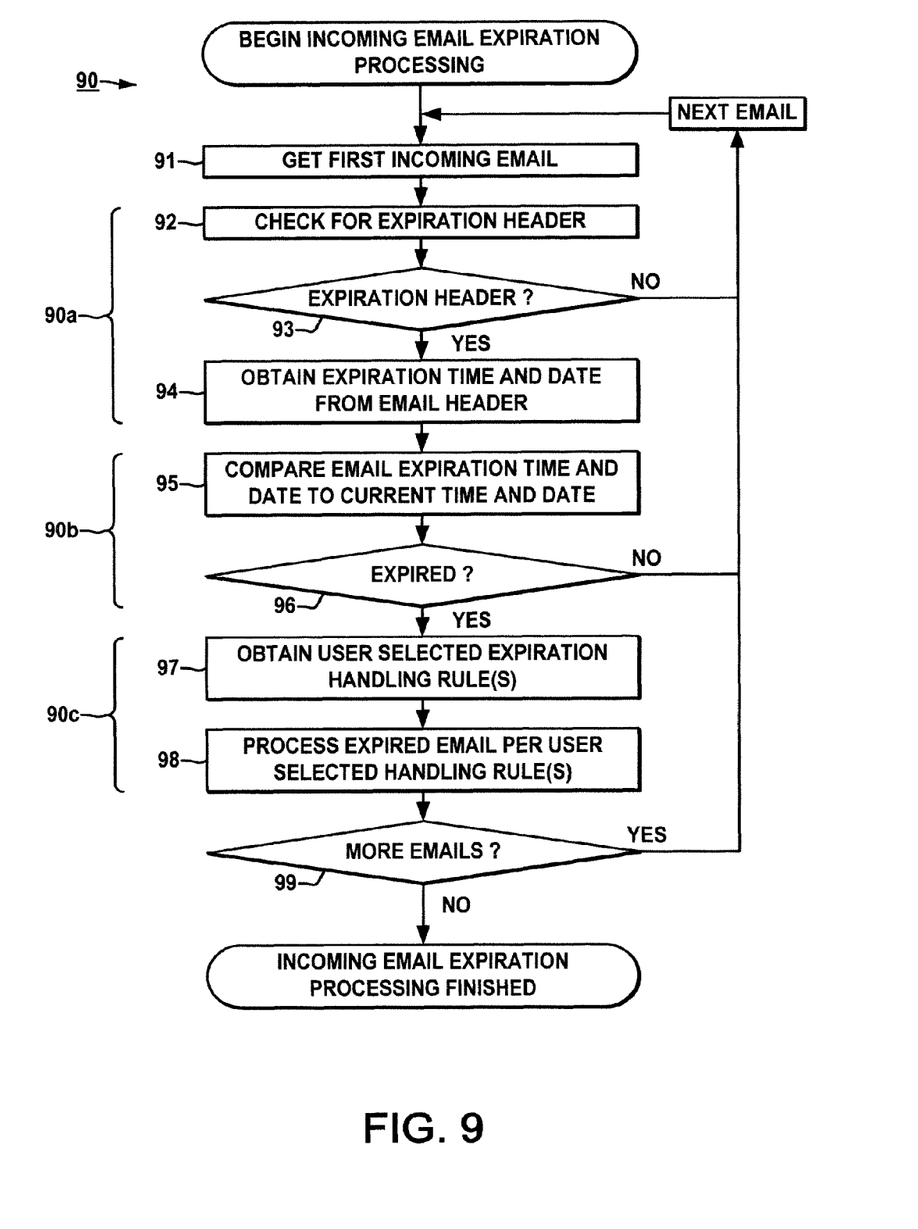
FIG. 9 is a flow diagram illustrating an exemplary electronic message expiration processing method implemented in the electronic message expiration systems of FIG. 1.

Referring now to FIG. 9, an exemplary incoming electronic message handling process 90 is illustrated, in which the exemplary expiration auditing and handling components (components 36a and 36b in FIG. 2, components 28a and 28b in FIG. 3) operate to determine at 90a whether an electronic message has a temporal expiration value 38v, and if so, determine at 90b whether the electronic message is to be expired based on the temporal expiration value and a current time, and if so, selectively process the electronic message at 90c based on the selected expired electronic message handling rule(s) 28d, 36d. The auditing and handling begins for a first electronic message at 91 in FIG. 9. In this regard, the auditing component 28a, 36a operates to check and audit the expiration time of all the emails in the folders, and to compare the expiration times with the current time during a configured (and possibly user selectable) auditing time. A header check is performed at 92 by message parsing or other technique to determine at 93 whether the message has an expiration header 38x. If not (NO at 93), the process 90 returns to get the next email.

If an expiration header 38x is found in the current message (YES at 93), the specified expiration time/date value 38v is obtained at 94 from the header 38x and is compared at 95 to the current time and date. A determination is then made at 96 as to whether the message has expired or not. In the illustrated embodiments, this involves comparison of the expiration time/date value 38v with the current time and date, and may also include any offsets specified in the handling rule(s) 28d, 36d selected by the user (e.g., if the user has selected to delete the messages 2 days or some other offset value after expiration). Alternatively, any handling rule offset can be considered in application of the handling process, with the initial expiration determination at 96 involving only the current time and the specified expiration time. If the message is not yet expired (NO at 96), the process 90 returns to get the next email. However, if the message is expired (YES at 96), the selective processing or handling 90c begins at 97 with the handling component 28b, 36b obtaining the user selected expiration handling rule(s) 28d, 36d. The message is then processed at 98 according to the specified rule(s) 28d, 36d. Thereafter, a determination is made at 99 as to whether any electronic messages remain to be audited. If so (YES at 99), these are obtained and processed as described above, and otherwise (NO at 99), the incoming electronic message processing 90 is completed. This auditing and handling process 90 can be repeated periodically or aperiodically, where the user may be provided with the option to set the auditing times or periods.

Figure 10:
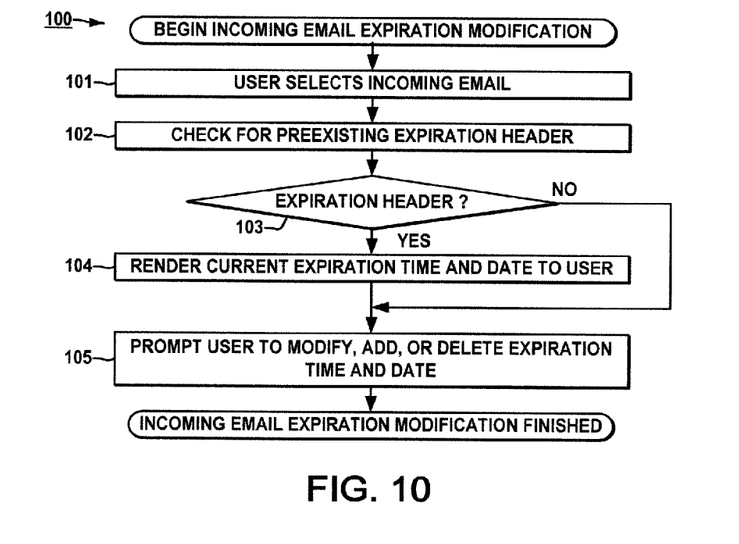
FIGS. 10 and 11 are flow and schematic diagrams illustrating exemplary user modification of expiration values for incoming electronic messages in the electronic message expiration systems of FIG. 1.
Figure 11:
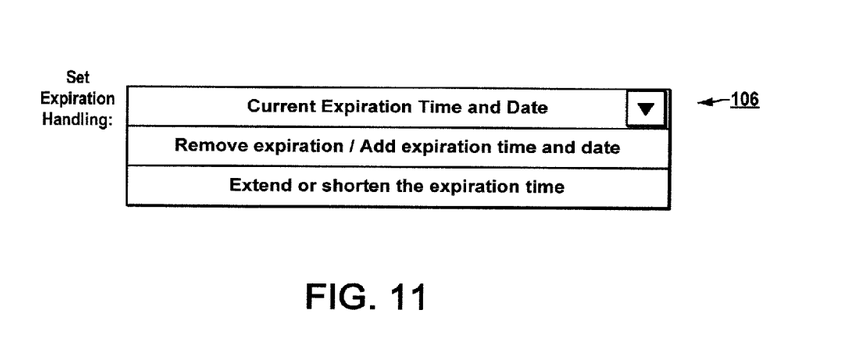

FIGS. 10 and 11 illustrate operation of the exemplary expiration modification components 28c, 36c with respect to allowing the user to modify the expiration aspects of a given incoming electronic message 29, 38. In this regard, a recipient of an electronic message may want to reset or modify the expiration date of some received emails and/or to delete expiration of certain emails that the user wants to retain, while still having the expiration handling rule(s) 28d, 36d set to automatically process remaining incoming emails having preset expiration parameters. An electronic message expiration modification process 100 is illustrated in FIG. 10, wherein the user selects a given message at 101 (e.g., from an in-box), and the modification component 28c, 36c checks the message for a pre-existing expiration header 38x at 102. A determination is made at 103 as to whether the message has an existing expiration header 38x and if so (YES at 103), the current expiration value 38v is rendered to the user at 104. At 105, the user is prompted to modify, add, or delete the expiration time and date value 38v. An exemplary user interface 106 is illustrated in FIG. 11 for rendering the current expiration value 38v to the user, and for allowing the user to modify, add, or delete expiration values for the selected electronic message 38. In this example, the interface 106 initially displays (or audible announces) the current expiration value (including an indication of "None"), and a drop-down feature is presented allowing the user to remove expiration to avoid the email being expired, extend or shorten the expiration time of the email, or to add an expiration value 38v to the email if one is not currently set. The modification component 28c, 36c in one embodiment then modifies, adds, or deletes the corresponding expiration header 38x of the message 38 and the updated expiration setting or value 38v will be taken into account in the next expiration audit.

Referring now to FIG. 12, the above described electronic message expiration features can also be applied with respect to short messages (SMS) or other fauns of electronic messages. An exemplary telecommunications system 202 is shown in FIG. 12 with short message expiration systems 242 having equivalent or similar functionality for expiration processing of short messages (SMS) in accordance with the disclosure. The system 202 includes various operationally interconnected networks of various topologies, including an SS7 network 210 with various network elements being operatively coupled to provide mobile telecommunications in a known manner. The system 202 includes one or more mobile switching centers (MSC) 212 with an associated home location register (HLR) 214 and a short message service center (SMSC) 218. The system 202 may include any number of MSCs 212, HLRs 214, SMSCs 218, visitor location registers VLRs, along with base station systems, base station controllers, etc., and other network elements (not shown) for implementing mobile telecommunications functionality. The network 210 is also operatively coupled to one or more foreign networks 220 via an INT SCCP gateway 222 providing message exchange between the SS7 network 210 and the foreign network 220 whereby mobile communications can be achieved between a mobile phone or device 216 located in the network 210 and another mobile communications device 226 in the foreign network 220. The SS7 network 210 is also operatively coupled with an Internet Protocol (IP) network or other packet-based network 230 for providing communications with one or more 1P-based devices, such as a computer 232, wherein the IP-based system 230 may include suitable IP gateway elements (not shown) coupling the IP network 230 with the SS7 network 210 to provide call and other services including short messaging (SMS) services between IP-based devices 232 and the exemplary mobile device 216 and other devices associated with the network 210. The various exemplary networks 210, 220, and 230 thus provide communicative connection of various communications devices and network elements allowing various telephones, mobile units, computers, digital assistants, etc. to communicate with one another for exchange or transfer of voice and/or video, short messages, and other data or information therebetween, wherein the telecommunications system 202 generally can include any number of wireless, wireline, and/or packet-switched networks, wherein only a few exemplary elements are illustrated in FIG. 12 for purposes of description without obscuring the various electronic message expiration features and aspects of the disclosure.

The illustrated system 202, moreover, includes one or more network servers 240 or other network elements, in or on which one or more SMS expiration systems 242 are provided, such as in the form of application software components as described in the expiration systems 28, 32 above, wherein the electronic message expiration system 242 can be resident on one network element such as the server 240 or can be distributed across multiple network elements operatively coupled with the SS7 network 210. Alternatively or in combination, message expiration processing systems 242 can be implemented in the SMSC 218 and/or in the MSC 212 as depicted in FIG. 12. In addition, the application 242 can be any suitable combination of hardware, software, logic, etc., whether unitary or distributed. The systems 242 in the system 202, moreover, can be accessed for programming or configuration by a user via a computer or other device 248 operatively coupled with the server element 240 or with the SS7 network 210, or via the user's mobile unit 216, 226 for adaptation, programming, updating, etc. of the expiration settings as described above. In this manner, the system 242 provides the above described advantages for automatic or semi-automated expiration handling of temporally relevant short messages, whereby a sender of a short message can set an expiration value 38v for a given message, which is then associated with the message for corresponding (e.g., recipient user-selectable) expiration processing.

While specifically illustrated and described herein with respect to short messages and emails, the disclosure and the expiration handling aspects thereof are also applicable to other forms of electronic messages, wherein the disclosure is not limited to the illustrated implementations or embodiments.

To further illustrate the operation of the exemplary message expiration systems 26, 32, 242, two illustrative examples are hereinafter described. In one situation, a first email user Alex is hosting a regular group meeting on Friday afternoon from 3:00 pm to 4:00 pm. In order to announce the meeting, Alex sends a group meeting notice via email on Thursday afternoon. On Friday at 2:30 pm, in order to provide a friendly reminder to the group members, Alex forwards his previous email to the group. When composing the forwarded email, Alex sets the email to expire after 1 hour. The expiration header 38x (FIG. 6 above) is added to the email 38 by the system 32 and the corresponding temporal expiration value 38v is calculated by his email client 30 and these are included in the email message 38. The email client 30 of each group member receives the email reminder 38. At 3:30 pm, the email server 20 and recipient's email client 30 mark the email as "Expired". Most of group members previously set their email client 30 to delete expired emails automatically. This email is deleted automatically on these email clients at the next email expiration audit. One member, Alice, has configured her email client 30 not to delete her expired emails, and accordingly, Alex's reminder email is not deleted from Alice's client 30.

Another example relates to expiration of advertising emails. In this scenario, an email sender Carl is the sales director of an on-line store and wishes to notify subscribed members of the store that there will be a sales promotion starting next Monday and extending until the following Friday. Carl uses the above described system 32 of his email client 30 to construct and send an email to the subscriber members, in which he specifies that the email is to expire after the promotion ends by setting the email to expire after 2 weeks. The system 32 calculates the absolute expiration time according to when the email is sent by Carl, and incorporates a corresponding header 38x and expiration value 38v (e.g., optionally including a time zone offset value) into the sent email. All the subscribed members receive the email promotion, including one subscribed member Dan who is on vacation and won't be back until after the promotion ends. Dan, knowing that he would not be checking his in-box while on vacation, and anticipating receipt of time-relevant promotional email, has configured the handling rule(s) 36d of the expiration system 32 of his email client 30 to "Move my expired emails immediately to Trash folder". In this case, Dan's email server checks and moves all expired emails to his Trash folder while he is away. In this example, moreover, Dan's mailbox is about to overflow, and the emails server 30 starts to delete the earliest emails in the Trash folder to free-up space, including the promotional message sent by Carl. Upon returning from vacation, Dan checks his emails and does not have to read and delete Carl's email. Thus, the system 32 allows Dan to avoid being bothered by expired emails in his in-box folder, and his mailbox is not jammed to the full limit.

As illustrated and described in the above examples, the disclosure presents a novel expiration approach to email, short messages, and other electronic messages, which can be implemented using a new "Expiration:" header in the message format, as well as a corresponding new user interface for specifying expiration upon composing new messages. In addition, the disclosure provides expiration handling procedures in the email client, email server, SMSC, MSC, or other network servers or elements, to mark expiration and apply actions according to the rule(s) selected by the subscriber/user. The procedures may also allow the sender to set expiration, and further allow the recipient to add, modify, or delete electronic message expiration settings for a given email. Moreover, the disclosure provides selectivity with respect to rules or procedures for handling expired emails for improving efficiency and saving email space occupation on the email servers and clients.

While the various concepts of the disclosure has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for handling electronic message expiration, the method comprising: determining whether an electronic message has a temporal expiration value; if the electronic message has a temporal expiration value, determining whether the electronic message is to be expired based on the temporal expiration value and a current time; if the electronic message is to be expired, selectively processing the electronic message based on an expired electronic message handling rule; allowing the user to modify, add, or delete a temporal expiration value associated with a given incoming electronic message sent to the user: allowing a user to select from a plurality of expired electronic message handling rules to be used in processing electronic messages to the user; and storing the user-selected expired electronic message handling rule.

2. The method of claim 1, wherein the electronic message is an email, and wherein determining whether the electronic message has a temporal expiration value comprises determining whether the email has a temporal expiration value in a message header.

3. The method of claim 1, wherein the electronic message is a short message.

4. The method of claim 1, further comprising:
allowing the user to select a given incoming electronic message sent to the user; and
prompting the user to modify, add, or delete a temporal expiration value associated with the selected incoming electronic message.

5. The method of claim 1, further comprising allowing the user to set a temporal expiration value for a given outgoing electronic message.

6. The method of claim 5, wherein the electronic message is an email, further comprising adding an expiration header with a temporal expiration value to the email.

7. The method of claim 4, further comprising:
determining if the selected incoming electronic message has a preexisting expiration header; and
if the selected incoming electronic message has a preexisting expiration header, rendering a current temporal expiration value of the preexisting expiration header to the user.

8. A communications system, comprising:
a network operatively coupling a plurality of network elements to one another to allow transport of electronic messages between the network elements; a first network element comprising at least one processor operatively coupled with the network, the first network element comprising an electronic message expiration system implemented using the at least one processor, and operative to selectively process electronic messages having a temporal expiration value based on at least one expired electronic message handling rule, wherein the electronic message expiration system allows a user to modify, add, or delete a temporal expiration value associated with a given incoming electronic message sent to the user; wherein the electronic message expiration system prompts a user to select from a plurality of expired electronic message handling rules to be used in processing electronic messages to the user, and stores the user-selected expired electronic message handling rule.

9. The communications system of claim 8, wherein the first network element is an email server.

10. The communications system of claim 8, wherein the first network element is a user computer.

11. The communications system of claim 8, wherein the electronic message is a short message, and wherein the first network element is a network server.

12. The communications system of claim 8, wherein the electronic message is a short message, and wherein the first network element is a short message service center.

13. The communications system of claim 8, wherein the electronic message is a short message, and wherein the first network element is a mobile switching center.

14. The communications system of claim 8, wherein the electronic message expiration system is further operative to determine whether the electronic message has a temporal expiration value in a message header.

15. The communications system of claim 8, wherein the electronic message expiration system is operative to:
allow the user to select a given incoming electronic message sent to the user;
determine if the selected incoming electronic message has a preexisting expiration header;
if the selected incoming electronic message has a preexisting expiration header, to render a current temporal expiration value of the preexisting expiration header to the user; and
prompt the user to modify, add, or delete a temporal expiration value associated with the selected incoming electronic message.

16. The communications system of claim 8, wherein the electronic message expiration system allows a user to set a temporal expiration value for a given outgoing electronic message.

17. The communications system of claim 16, wherein the electronic message is an email, and wherein the electronic message expiration system selectively adds an expiration header with a temporal expiration value to the email.

18. The communications system of claim 8, wherein the temporal expiration value includes a time zone offset.

19. A non-transitory computer-readable medium having computer-executable instructions for performing steps comprising: determining whether an electronic message has a temporal expiration value; if the electronic message has a temporal expiration value, determining whether the electronic message is to be expired based on the temporal expiration value and a current time; if the electronic message is to be expired, selectively processing the electronic message based on an expired electronic message handling rule; allowing a user to modify, add, or delete a temporal expiration value associated with a given incoming electronic message sent to the user; allowing the user to select from a plurality of expired electronic message handling rules to be used in processing electronic messages to the user; and storing the user-selected expired electronic message handling rule.

20. The computer-readable medium of claim 19, further comprising computer-executable instructions for determining whether the electronic message has a temporal expiration value in a message header.

21. The computer-readable medium of claim 19, further comprising computer-executable instructions for:
allowing the user to select a given incoming electronic message sent to the user;
prompting the user to modify, add, or delete a temporal expiration value associated with the selected incoming electronic message;
determining if the selected incoming electronic message has a preexisting expiration header; and
if the selected incoming electronic message has a preexisting expiration header, rendering a current temporal expiration value of the preexisting expiration header to the user.

22. The computer-readable medium of claim 19, further comprising computer-executable instructions for allowing a user to set a temporal expiration value for a given outgoing electronic message.

23. An electronic message expiration system, comprising:
at least one processor; an incoming message expiration auditing component implemented using the at least one processor, and operative to determine whether an electronic message has a temporal expiration value; an incoming message expiration handling component implemented using the at least one processor, and operative if the electronic message has a temporal expiration value to determine whether the electronic message is to be expired based on the temporal expiration value and a current time, and if the electronic message is to be expired, to selectively process the electronic message based on an expired electronic message handling rule; and an incoming message expiration modification component implemented using the at least one processor, and operative to allow a user to modify, add, or delete a temporal expiration value associated with a given incoming electronic message sent to the user, wherein the incoming message expiration handling component is further operative to prompt a user to select from a plurality of expired electronic message handling rules to be used in processing electronic messages to the user, and to store the user-selected expired electronic message handling rule.

24. The electronic message expiration system of claim 23, wherein the incoming message expiration auditing component and the incoming message expiration handling component are implemented in an email server.

25. The electronic message expiration system of claim 23, wherein the incoming message expiration auditing component and the incoming message expiration handling component are implemented in a user computer.

26. The electronic message expiration system of claim 23, wherein the incoming message expiration auditing component and the incoming message expiration handling component are implemented in a network server.

27. The electronic message expiration system of claim 23, wherein the incoming message expiration auditing component and the incoming message expiration handling component are implemented in a short message service center.

28. The electronic message expiration system of claim 23, wherein the incoming message expiration auditing component and the incoming message expiration handling component are implemented in a mobile switching center.

29. The electronic message expiration system of claim 23, wherein the incoming message expiration auditing component is further operative to determine whether the electronic message has a temporal expiration value in a message header.

30. The electronic message expiration system of claim 23, wherein the incoming message expiration modification component is further operative to:
  allow the user to select a given incoming electronic message sent to the user;
  determine if the selected incoming electronic message has a preexisting expiration header;
  if the selected incoming electronic message has a preexisting expiration header, to render a current temporal expiration value of the preexisting expiration header to the user; and
  prompt the user to modify, add, or delete a temporal expiration value associated with the selected incoming electronic message.

31. The electronic message expiration system of claim 23, further comprising an outgoing message expiration processing component operative to allow a user to set a temporal expiration value for a given outgoing electronic message.

32. The electronic message expiration system of claim 31, wherein the outgoing message expiration processing component is further operative to selectively add an expiration header with a temporal expiration value to the outgoing electronic message.

* * * * *

UNITED STATES PATENT AND TRADEMARK OFFICE
CERTIFICATE OF CORRECTION

| | | |
|---|---|---|
| PATENT NO. | : 8,635,288 B2 | Page 1 of 1 |
| APPLICATION NO. | : 12/744839 | |
| DATED | : January 21, 2014 | |
| INVENTOR(S) | : Yigang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 591 days.

Signed and Sealed this
Eleventh Day of August, 2015

Michelle K. Lee
*Director of the United States Patent and Trademark Office*